(12) United States Patent
Nakazawa

(10) Patent No.: US 12,519,113 B2
(45) Date of Patent: Jan. 6, 2026

(54) FUEL CELL

(71) Applicant: TOYOTA JIDOSHA KABUSHIKI KAISHA, Toyota (JP)

(72) Inventor: Satoshi Nakazawa, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 487 days.

(21) Appl. No.: 18/161,379

(22) Filed: Jan. 30, 2023

(65) Prior Publication Data

US 2023/0307666 A1  Sep. 28, 2023

(30) Foreign Application Priority Data

Mar. 25, 2022 (JP) .................... 2022-049562

(51) Int. Cl.
| | |
|---|---|
| *H01M 8/0247* | (2016.01) |
| *H01M 8/0271* | (2016.01) |
| *H01M 8/10* | (2016.01) |
| *H01M 8/1004* | (2016.01) |

(52) U.S. Cl.
CPC ....... *H01M 8/0247* (2013.01); *H01M 8/0271* (2013.01); *H01M 8/1004* (2013.01); *H01M 2008/1095* (2013.01)

(58) Field of Classification Search
CPC .................................................. H01M 8/0271
See application file for complete search history.

(56) References Cited

U.S. PATENT DOCUMENTS

| | | | |
|---|---|---|---|
| 2020/0287231 | A1 | 9/2020 | Inque |
| 2021/0098798 | A1 | 4/2021 | Nonoyama et al. |
| 2021/0098799 | A1 | 4/2021 | Nonoyama |
| 2021/0288338 | A1 | 9/2021 | Nonoyama et al. |
| 2022/0311019 | A1* | 9/2022 | Oda ............. H01M 4/8807 |

FOREIGN PATENT DOCUMENTS

| | | |
|---|---|---|
| JP | 2011065828 A | 3/2011 |
| JP | 2020145026 A | 9/2020 |
| JP | 2021057200 A | 4/2021 |
| JP | 2021057209 A | 4/2021 |
| JP | 2021144854 A | 9/2021 |

* cited by examiner

*Primary Examiner* — Brian R Ohara
(74) *Attorney, Agent, or Firm* — Hunton Andrews Kurth LLP

(57) ABSTRACT

A fuel cell includes: a membrane electrode assembly including a first catalyst layer, a second catalyst layer, and an electrolyte membrane disposed between the first catalyst layer and the second catalyst layer; a first gas diffusion layer laminated on the first catalyst layer; a second gas diffusion layer laminated on the second catalyst layer; a support disposed on at least a part of a periphery around the membrane electrode assembly; and a cover sheet disposed between the first gas diffusion layer and the membrane electrode assembly to bridge the support and at least one end portion of the electrolyte membrane or the first catalyst layer, in which the cover sheet includes a sheet portion as a layer on a side of the membrane electrode assembly and a permeation portion laminated on the sheet portion and permeating into the first gas diffusion layer.

2 Claims, 5 Drawing Sheets

FUEL CELL

CROSS-REFERENCE TO RELATED APPLICATION

This application claims priority to Japanese Patent Application No. 2022-049562 filed on Mar. 25, 2022, incorporated herein by reference in its entirety.

BACKGROUND

1. Technical Field

The present disclosure relates to a fuel cell.

2. Description of Related Art

Japanese Unexamined Patent Application Publication No. 2021-057200 (JP 2021-057200 A), Japanese Unexamined Patent Application Publication No. 2021-057209 (JP 2021-057209 A), and Japanese Unexamined Patent Application Publication No. 2020-145026 (JP 2020-145026 A) disclose that a frame member (a resin frame member, a support frame) and an electrode laminate are joined using an adhesive. Japanese Unexamined Patent Application Publication No. 2021-144854 (JP 2021-144854 A) discloses a structure where an adhesive and a cover sheet are disposed to bridge the support frame and a membrane electrode assembly and a gas diffusion layer is laminated on the cover sheet.

SUMMARY

When the frame member and the electrode laminate are joined directly using the adhesive as in JP 2021-057200 A, JP 2021-057209 A, and JP 2020-145026 A, the electrode laminate may be damaged due to thermal expansion or thermal shrinkage of various members including the frame member or external force. In addition, in the configuration where the cover sheet is disposed as in JP 2021-144854 A, a phenomenon in which the membrane electrode assembly or the gas diffusion layer is damaged is observed, and the damage may lead to leakage of reaction gas.

The present disclosure provides a fuel cell where damage to a membrane electrode assembly or a gas diffusion layer can be reduced when a support and the membrane electrode assembly are joined.

In a cover sheet including a sheet portion and a bonding layer that fixes the sheet portion, a space is formed due to the thickness of the cover sheet at a tip end portion of the cover sheet on a membrane electrode assembly side, and this space causes damage to the membrane electrode assembly or a gas diffusion layer. The technique of the present disclosure is completed by specific means for solving this problem. The details are as follows.

One aspect of the present disclosure relates to a fuel cell including: a membrane electrode assembly including a first catalyst layer, a second catalyst layer, and an electrolyte membrane disposed between the first catalyst layer and the second catalyst layer; a first gas diffusion layer laminated on the first catalyst layer and having at least a part of an outer peripheral end portion provided to pass an outer peripheral end of the membrane electrode assembly; a second gas diffusion layer laminated on the second catalyst layer; a support disposed on at least a part of a periphery around the membrane electrode assembly; and a cover sheet disposed between the first gas diffusion layer and the membrane electrode assembly to bridge the support and at least one end portion of the electrolyte membrane and the first catalyst layer, in which the cover sheet includes a sheet portion as a layer on a side of the membrane electrode assembly and a permeation portion laminated on the sheet portion and permeating into the first gas diffusion layer.

In the fuel cell according to the aspect, the first gas diffusion layer may include a diffusion member and a microporous layer provided on a surface of the diffusion member on a side of the first catalyst layer, and the permeation portion of the cover sheet may pass the microporous layer and may permeate up to the diffusion member.

In the fuel cell according to the aspect, an end surface of the support and an end surface of the membrane electrode assembly may be disposed to face each other through a gap.

According to the aspect of the present disclosure, in the fuel cell, the cover sheet is joined to the first gas diffusion layer side through the bonding layer, and the bonding layer permeates into the first gas diffusion layer. Therefore, the size of a space formed at a tip end of the cover sheet on the membrane electrode assembly side can be reduced, and damage to the membrane electrode assembly or the gas diffusion layer can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Unit Power Generation Cell

Figure 1:
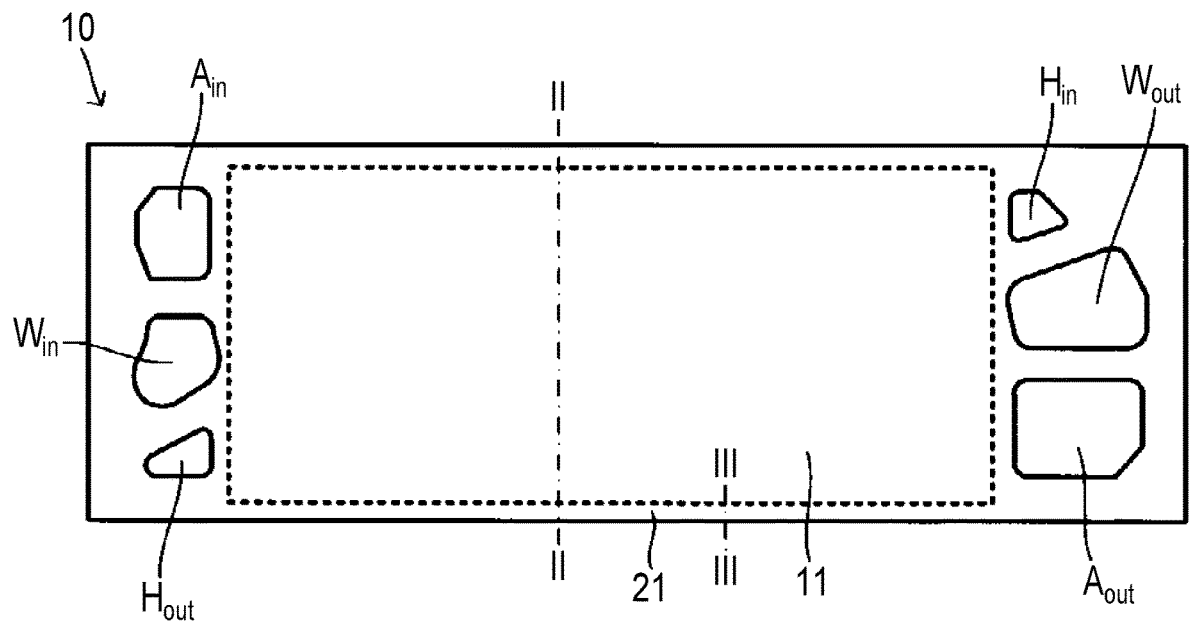
FIG. 1 is a plan view illustrating a unit power generation cell.
Figure 2:
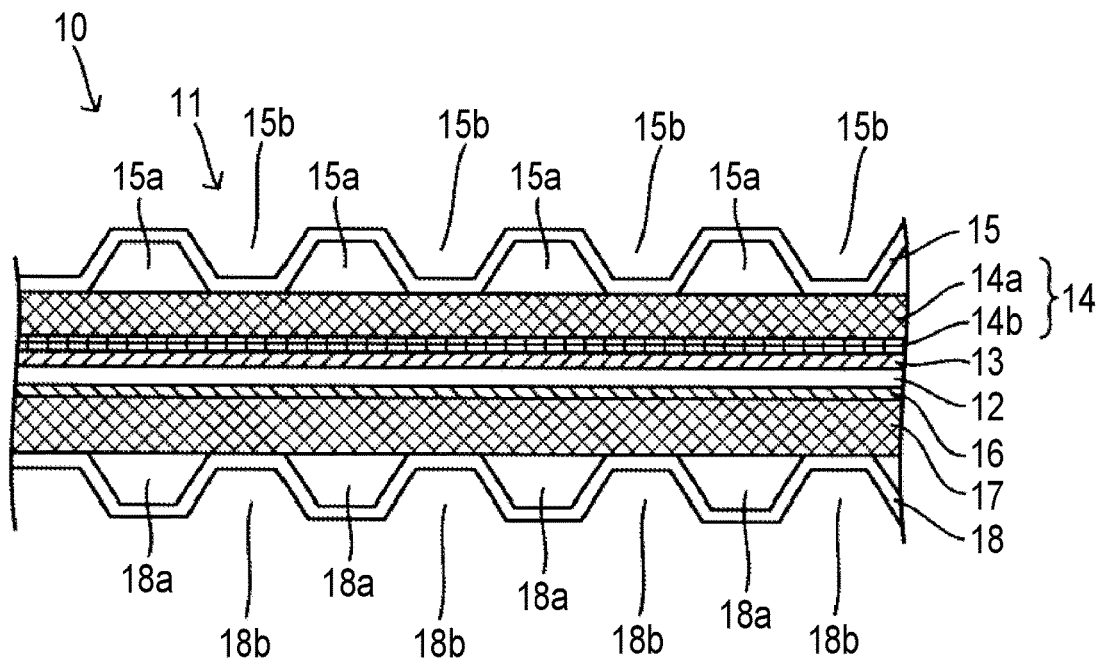
FIG. 2 is a sectional view illustrating a layer configuration of the power generation portion.
Figure 3:
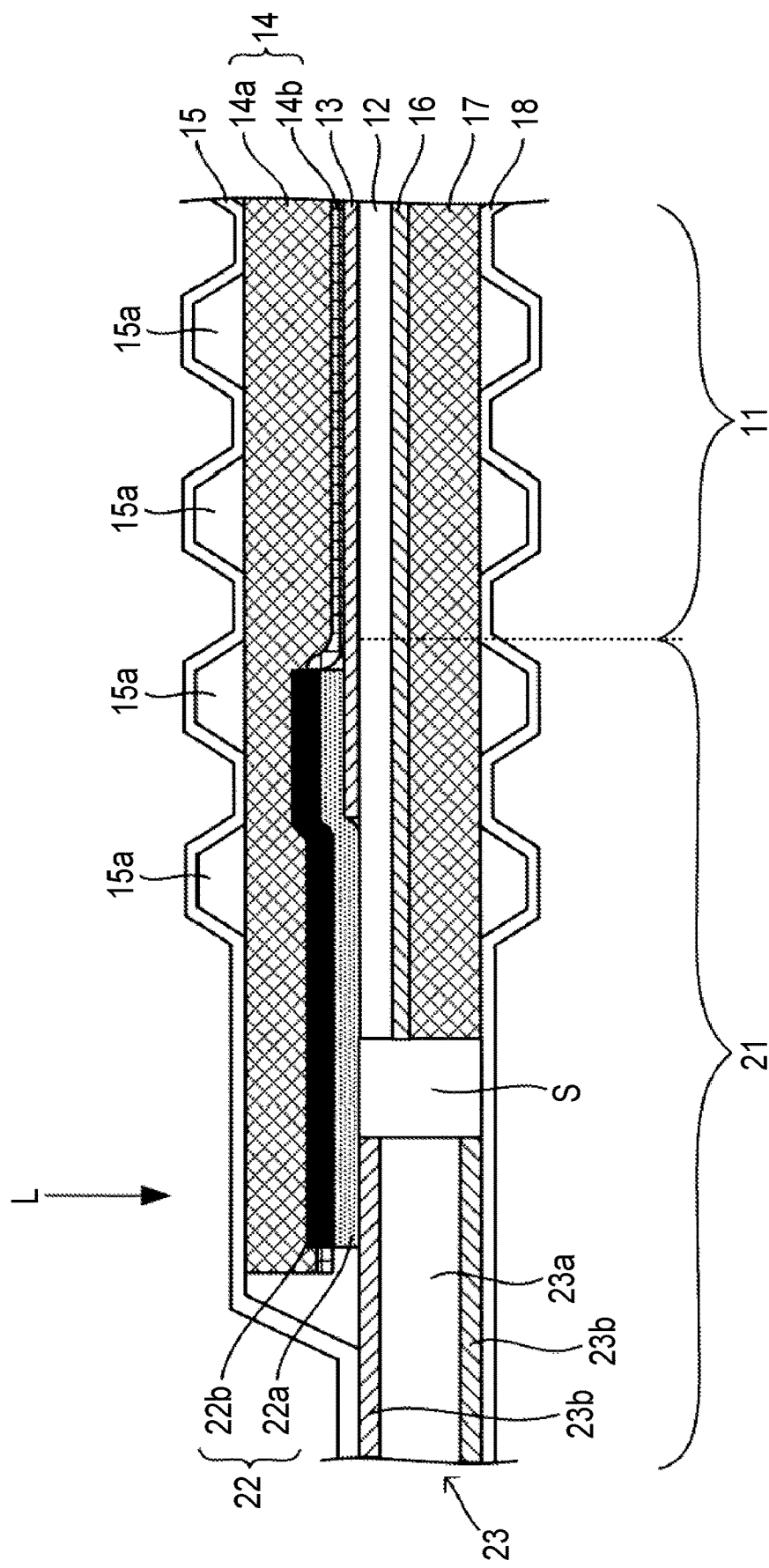
FIG. 3 is a sectional view illustrating a layer configuration of an outer peripheral portion.

FIGS. 1 to 3 are diagrams illustrating a unit power generation cell 10 according to one embodiment. The unit power generation cell 10 is a unit element that generates power by supplying hydrogen and oxygen (air), and a plurality of unit power generation cells 10 is laminated to configure a fuel cell.

FIG. 1 is a plan view illustrating the unit power generation cell 10, FIG. 2 illustrates a layer configuration of a power generation portion 11 in the unit power generation cell 10, and FIG. 3 is a diagram illustrating a layer configuration of an outer peripheral portion 21 in the unit power generation cell 10.

1.1 Power Generation Portion

The power generation portion 11 is, for example, a portion contributing to power generation in a portion surrounded by a dotted line in FIG. 1, in which a plurality of layers is laminated as in FIG. 2 illustrating the layer configuration (a part of the II-II section) of the power generation portion 11.

In the power generation portion 11 of the unit power generation cell 10, among sides between which an electrolyte membrane 12 is interposed, a first side is a cathode (oxygen supply side), and a second side is an anode (hydrogen supply side). In the cathode, a cathode catalyst layer 13 (first catalyst layer), a cathode gas diffusion layer 14 (first gas diffusion layer), and a cathode separator 15 (first separator) are laminated in this order from the electrolyte membrane 12 side. On the other hand, in the anode, an anode catalyst layer 16 (second catalyst layer), an anode gas diffusion layer 17 (second gas diffusion layer), and an anode separator 18 (second separator) are laminated in this order from the electrolyte membrane 12 side. The laminate including the electrolyte membrane 12, the cathode catalyst layer 13, and the anode catalyst layer 16 will also be referred to as a membrane electrode assembly. The thickness of the membrane electrode assembly is typically about 0.4 mm, and the thickness of the unit power generation cell 10 in the power generation portion 11 is typically about 1.3 mm.

Various layers can adopt well-known configurations and can adopt, for example, the following configuration.

1.1a. Electrolyte Membrane

The electrolyte membrane 12 is a solid polymer membrane that exhibits satisfactory proton conductivity in a wet state. The electrolyte membrane 12 is formed of, for example, a fluorine ion exchange membrane. For example, a carbon-fluorine polymer can be used, and specific examples thereof include a perfluoroalkyl sulfonic acid polymer (NAFION (registered trade name).

The thickness of the electrolyte membrane 12 is not particularly limited and is 100 μm or less, preferably 50 μm or less, and more preferably 10 μm or less.

1.1b. Cathode Catalyst Layer

The cathode catalyst layer 13 is a layer including a catalytic metal in a state where the catalytic metal is supported by a support. Examples of the catalytic metal include Pt, Pd, Rh, and an alloy including Pt, Pd, or Rh. Examples of the support include a carbon support, more specifically, carbon particles formed of glassy carbon, carbon black, activated carbon, coke, natural graphite, artificial graphite, or the like.

1.1c. Anode Catalyst Layer

As in the cathode catalyst layer 13, the anode catalyst layer 16 is also a layer including a catalytic metal in a state where the catalytic metal is supported by a support. Examples of the catalytic metal include Pt, Pd, Rh, and an alloy including Pt, Pd, or Rh. Examples of the support include a carbon support, more specifically, carbon particles formed of glassy carbon, carbon black, activated carbon, coke, natural graphite, artificial graphite, or the like.

1.1d. Cathode Gas Diffusion Layer

In the embodiment, the cathode gas diffusion layer 14 includes a diffusion member 14a and a microporous layer (hereinafter, referred to as "MPL") 14b.

The diffusion member 14a is a layer formed of, for example, a conductive porous body. Specific examples of the conductive porous body include a carbon porous body (for example, carbon paper, carbon cloth, or glassy carbon) and a metal porous body (metal mesh, metal foam).

The MPL 14b is a coating membrane that is applied to the cathode catalyst layer 13 side of the diffusion member 14a. The MPL 14b optionally has water repellency or hydrophilicity and has a function of adjusting moisture. As the MPL 14b, for example, a layer including a water-repellent resin, such as polytetrafluoroethylene (PTFE) and a conductive material, such as carbon black as major components is typically used.

1.1e. Anode Gas Diffusion Layer

The anode gas diffusion layer 17 is a layer formed of, for example, a conductive porous body. Specific examples of the conductive porous body include a carbon porous body (for example, carbon paper, carbon cloth, or glassy carbon) and a metal porous body (metal mesh, metal foam).

1.1f. Cathode Separator

The cathode separator 15 is a member that supplies reaction gas (in the embodiment, air) to the cathode gas diffusion layer 14, and includes a plurality of grooves 15a on a surface facing the cathode gas diffusion layer 14. The grooves function as reaction gas passages. The shape of the grooves is not particularly limited as long as the reaction gas can be supplied to the cathode gas diffusion layer 14 through the grooves. Examples of the shape of the grooves include a serpentine shape where a plate-shaped member is formed in a wavy shape. At this time, the plate thickness is typically 0.1 mm to 0.2 mm, and the height of unevenness is typically about 0.5 mm.

When the grooves have a serpentine shape, a groove 15b is formed on the opposite side of the cathode separator 15 from adjacent grooves 15a, and this groove 15b functions as a coolant passage.

In addition, in the cathode separator 15, as illustrated in FIG. 1, at a position extending outward from the power generation portion 11, an air inlet port $A_{in}$, a coolant inlet port $W_{in}$, a hydrogen outlet port $H_{out}$ are provided in a portion on a first end side in a direction in which the grooves 15a and 15b extend, and an air outlet port $A_{out}$, a coolant outlet port $W_{out}$, and a hydrogen inlet port $H_{in}$ are provided in a portion on a second end side in the direction in which the grooves 15a and 15b extend. Here, the grooves 15a communicate with the air inlet port $A_{in}$ and the air outlet port $A_{out}$, and the grooves 15b communicate with the coolant inlet port $W_{in}$ and the coolant outlet port $W_{out}$.

A material for forming the cathode separator 15 may be any material that can be used as a separator of a unit power generation cell, and may be a gas-impermeable conductive material. Examples of the material include a gas-impermeable dense carbon obtained by compressing carbon and a metal plate obtained by press molding.

1.1g. Anode Separator

The anode separator 18 is a member that supplies reaction gas (hydrogen) to the anode gas diffusion layer 17, and includes a plurality of grooves 18a on a surface facing the anode gas diffusion layer 17. The grooves function as reaction gas passages. The shape of the grooves is not particularly limited as long as the reaction gas can be supplied to the anode gas diffusion layer 17 through the grooves. For example, a serpentine shape can be used as in the embodiment. At this time, the sheet thickness is typically 0.1 mm to 0.2 mm, and the height of unevenness is typically about 0.4 mm.

When the grooves have a serpentine shape, a groove 18b is formed on the opposite side of the anode separator 18 from adjacent grooves 18a, and this groove 18b functions as a coolant passage.

In addition, in the anode separator 18, as illustrated in FIG. 1, at a position extending outward from the power generation portion 11, an air inlet port $A_{in}$, a coolant inlet port $W_{in}$, a hydrogen outlet port $H_{out}$ are provided in a portion on a first end side in a direction in which the grooves 18a and 18b extend, and an air outlet port $A_{out}$, a coolant outlet port $W_{out}$, and a hydrogen inlet port $H_{in}$ are provided in a portion on a second end side in the direction in which the grooves 18a and 18b extend. Here, the grooves 18a communicate with the hydrogen inlet port $H_{in}$ and the hydrogen outlet port $H_{out}$, and the grooves 18b communicate with the coolant inlet port $W_{in}$ and the coolant outlet port $W_{out}$.

A material for forming the anode separator 18 may be any material that can be used as a separator of a unit power generation cell, and may be a gas-impermeable conductive material. Examples of the material include a gas-impermeable dense carbon obtained by compressing carbon and a metal plate obtained by press molding.

1.1h. Power Generation by Power Generation Portion

As is well known, power is generated by the unit power generation cell 10 as follows.

Hydrogen supplied from the hydrogen inlet port $H_{in}$ to the grooves 18a of the anode separator 18 passes through the anode gas diffusion layer 17 and is decomposed into protons ($H^+$) and electrons ($e^-$) by the anode catalyst layer 16. The protons pass through the electrolyte membrane 12, the electrons pass through a conductive line leading to the outside of the unit power generation cell 10, and the protons and the electrons arrive at the cathode catalyst layer 13. The remaining hydrogen is exhausted from the hydrogen outlet port $H_{out}$.

Oxygen (air) is supplied from the air inlet port $A_{in}$ to the cathode catalyst layer 13 through the grooves 15a of the cathode separator 15 and the cathode gas diffusion layer 14. In the cathode catalyst layer 13, water ($H_2O$) is produced by the protons, the electrons, and the oxygen. The produced water and the remaining air pass through the cathode gas diffusion layer 14, arrive at the grooves 15a of the cathode separator 15, and are exhausted from the air outlet port $A_{out}$.

In the unit power generation cell 10, the flow of electrons that pass from the anode catalyst layer 16 through the conductive line leading to the outside of the unit power generation cell 10 is used as a current.

In addition, by disposing the unit power generation cells 10 adjacent to each other such that the cathode separator 15 of one unit power generation cell 10 overlaps the anode separator 18 of the other unit power generation cell 10, a coolant passage is formed by the grooves 15b of the cathode separator 15 and the grooves 18b of the anode separator 18. A coolant is supplied from the coolant inlet port $W_{in}$ to the coolant passage, the supplied coolant cools the unit power generation cell 10, and the coolant is exhausted from the coolant outlet port $W_{out}$.

1.2. Outer Peripheral Portion

The outer peripheral portion 21 is an outer peripheral portion of the unit power generation cell 10 outside the power generation portion 11 surrounded by the dotted line in FIG. 1, and a plurality of layers is laminated as in FIG. 3 illustrating the layer configuration (III-III section) of the outer peripheral portion 21.

1.2a. Structure of Outer Peripheral Portion

As can be seen from FIG. 3, the outer peripheral portion 21 has the following configuration in at least a part thereof.

The electrolyte membrane 12, the anode catalyst layer 16, and the anode gas diffusion layer 17 are laminated such that end surfaces thereof are positioned substantially at the same position and the end surface of the cathode catalyst layer 13 is positioned at a position that is recessed (retreated) from the end surface of the electrolyte membrane 12. Further, the end surface of the cathode gas diffusion layer 14 is positioned at a position that protrudes (advances) from the end surface of the electrolyte membrane 12 and extends up to a position overlapping a support 23 in a plan view of the unit power generation cell 10 (view from a direction in FIG. 1, a view in a direction indicated by arrow L in FIG. 3). The support 23 will be described below.

Even in the outer peripheral portion 21, the cathode separator 15 and the anode separator 18 are disposed such that each of the above-described layers is interposed as in the power generation portion 11. In addition, the end surfaces of the cathode separator 15 and the anode separator 18 extend to protrude from each of the end surfaces of the membrane electrode assembly, the cathode gas diffusion layer 14, and the anode gas diffusion layer 17. In the extended portion, the support 23 is disposed between the cathode separator 15 and the anode separator 18. In the outer peripheral portion 21, the passage is unnecessary in the cathode separator 15 and the anode separator 18. Therefore, the grooves 15a and the groove 18a are not formed (note that the formation of grooves in a part is not interfered as can be seen from FIG. 3).

A cover sheet 22 is disposed to bridge an end portion of a surface of the support 23 facing the cathode side and an end portion of a surface of the membrane electrode assembly facing the cathode side. The cover sheet 22 will be described below.

1.2b. Support

The support 23 functions as a seal member that seals a gap between the cathode separator 15 and the anode separator 18 in the outer peripheral portion 21 of the unit power generation cell 10.

The support 23 includes a substrate 23a and a bonding layer 23b that is disposed on each of opposite surfaces (a surface facing the cathode side and a surface facing the anode side) of the substrate 23a. The bonding layer 23b seals the inside of the power generation portion 11 by being bonded to the cathode separator 15 and the anode separator 18. Accordingly, a space between the cathode separator 15 and the anode separator 18 is curved to change depending on a layer interposed therebetween, the space is narrowed in a part of a portion where the support 23 is disposed alone as can be seen from FIG. 3, and the cathode separator 15 and the anode separator 18 are fixed in a state where the support 23 is interposed therebetween.

The substrate 23a is formed of a thermoplastic resin material having electrical insulating properties and airtightness and having a relatively high melting point. Examples of the material include a crystalline polymer, more specifically, engineering plastics. Examples of the engineering plastics include a polyethylene naphthalate resin (PEN) and a polyethylene terephthalate resin (PET).

The thickness of the substrate 23a is not particularly limited and is preferably 0.05 mm or more and 0.25 mm or less.

As the bonding layer 23b, any well-known bonding layer can be used as long as it has adhesion in a bonded state. Examples of the bonding layer include a modified polyolefin where a functional group (for example, maleic anhydride or epoxy) is introduced into polyolefin to impart adhesion.

As can be seen from FIG. 3, the support 23 is disposed such that an end surface thereof faces the end surfaces of the membrane electrode assembly and the anode gas diffusion layer 17 with a space S interposed therebetween, and extends to the side opposite to the power generation portion 11. The space S absorbs a dimensional change caused by linear expansion of the support 23, the membrane electrode assembly, or the like, and damage by expansion and shrinkage can be reduced.

1.2c. Cover Sheet

Figure 4:
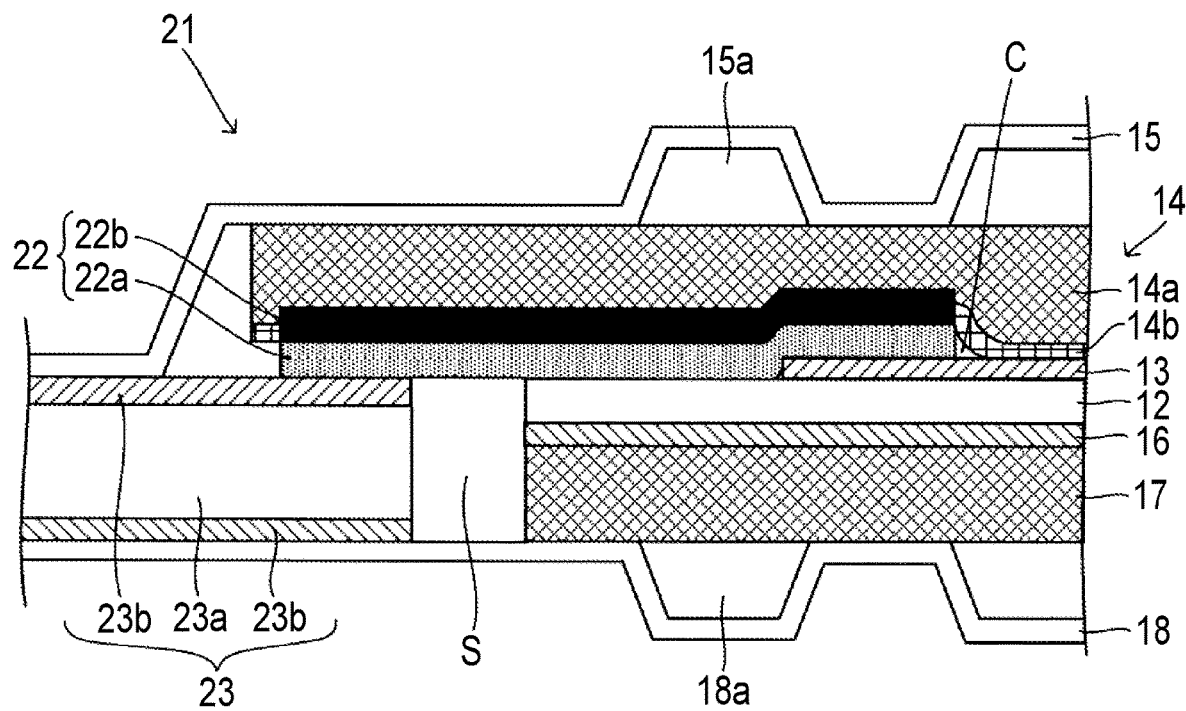
FIG. 4 is an enlarged view illustrating a part of FIG. 3.

As described above, the cover sheet 22 is disposed to bridge an end portion of a surface of the support 23 facing the cathode side and an end portion of a surface of the membrane electrode assembly facing the cathode side. FIG. 4 is an enlarged view focusing on the vicinity of a portion where the cover sheet 22 is disposed in FIG. 3. As can be seen from FIGS. 3 and 4, the cover sheet 22 includes a sheet portion 22a and a permeation portion 22b that is laminated on the sheet portion 22a. The sheet portion 22a faces the membrane electrode assembly side, and the permeation portion 22b faces the cathode gas diffusion layer 14 side.

The sheet portion 22a is disposed such that a first end portion covers a surface end portion of the support 23 on the cathode side and a second end portion covers at least one surface end portions of the electrolyte membrane 12 and the cathode catalyst layer 13 (in the embodiment, the sheet portion 22a is disposed to cover the surface end portions of both of the electrolyte membrane 12 and the cathode catalyst layer 13). As a result, the cathode and the anode can be appropriately separated from each other in the outer peripheral portion 21.

The sheet portion 22a is formed of a material that does not allow permeation of the reaction gas of the fuel cell. As the member that does not allow permeation of reaction gas, a film-shaped member formed of a resin, such as polypropylene, polyphenylene sulfide, polyethylene naphthalate, nylon, or an ethylene vinyl alcohol copolymer can be adopted. In particular, from the viewpoints of hydrolysis resistance and adhesion with the electrolyte membrane, nylon 11, nylon 12, nylon 9T, or ethylene vinyl alcohol can be used. In addition, in order to improve the adhesion with the electrolyte membrane 12, an additive having an amide group, an epoxy group, a hydroxyl group, or the like may be added.

The thickness of the sheet portion 22a is not particularly limited and is preferably about 40 μm or more and 60 μm or less.

The permeation portion 22b is a layer that permeates into the cathode gas diffusion layer 14 and has adhesion for joining the sheet portion 22a and the cathode gas diffusion layer 14. The permeation portion 22b is formed of a material having a lower melting point than the sheet portion 22a. As a result, when heated, the permeation portion 22b is preferentially fluidized such that the permeation portion 22b can permeate into the cathode gas diffusion layer 14.

The degree of permeation (permeation depth) of the permeation portion 22b into the cathode gas diffusion layer 14 is not particularly limited. When the MPL 14b is provided in the cathode gas diffusion layer 14 as in the embodiment, it is preferable that the permeation portion 22b passes the MPL 14b and reaches the diffusion member 14a. As a result, reliable joining can be realized.

As illustrated in FIGS. 3 and 4, the permeation portion 22b may be disposed across the entirety of one surface (the surface on the cathode gas diffusion layer 14 side) of the sheet portion 22a. However, the embodiment is not limited to this configuration, the permeation portion 22b may be intermittently provided on one surface of the sheet portion 22a or may be disposed on a portion of the one surface that is half of the support 23 side.

A material for forming the permeation portion 22b is not particularly limited as long as it melts and permeates into the cathode gas diffusion layer 14 and has adhesion for joining the sheet portion 22a and the cathode gas diffusion layer 14. From the viewpoints of a relatively low melting point and excellent hydrolysis resistance, polyethylene or polypropylene can be preferably used.

In addition, regarding the material for forming the permeation portion 22b, in order to improve the adhesion with the MPL 14b, an epoxy group, a hydroxyl group, or the like may be copolymerized with polyethylene or polypropylene or an additive formed of an epoxy group, a hydroxyl group, or an amide group may be added.

In addition, in order to improve the adhesion between the sheet portion 22a and the permeation portion 22b, a compatibilizer can also be used.

1.2d. Effect

When one end side of the cover sheet is disposed between the cathode gas diffusion layer and the membrane electrode assembly, a space indicated by C in FIG. 4 is formed due to the thickness of the cover sheet. The space tends to increase as the thickness of the cover sheet increases. As the space increases, damage to the membrane electrode assembly or the cathode gas diffusion layer is likely to occur.

On the other hand, as described above, the portion for sealing and the portion for adhesion are needed for the cover sheet, and each of the portion for sealing and the portion for adhesion needs to be thick to some extent that the function can be ensured. Accordingly, the space C tends to increase by all means.

On the other hand, in the cover sheet according to the present disclosure, the portion for adhesion (permeation portion 22b) can be formed inside the cathode gas diffusion layer 14. Therefore, the thickness that causes the formation of the space C corresponds to the sheet portion 22a alone and can be reduced, and the space C formed between the tip end of the sheet portion 22a of the cover sheet 22 on the membrane electrode assembly side and the cathode gas diffusion layer 14 can be reduced to be small. As a result, the possibility of damage to the membrane electrode assembly or the cathode gas diffusion layer can be reduced, and the leakage of the reaction gas caused by the damage can be reduced.

At this time, when the permeation portion 22b passes the MPL 14b of the cathode gas diffusion layer 14 and reaches the diffusion member 14a, more reliable adhesion and sealing can be performed.

1.2e. Another Embodiment 1 of Outer peripheral Portion

Figure 5:
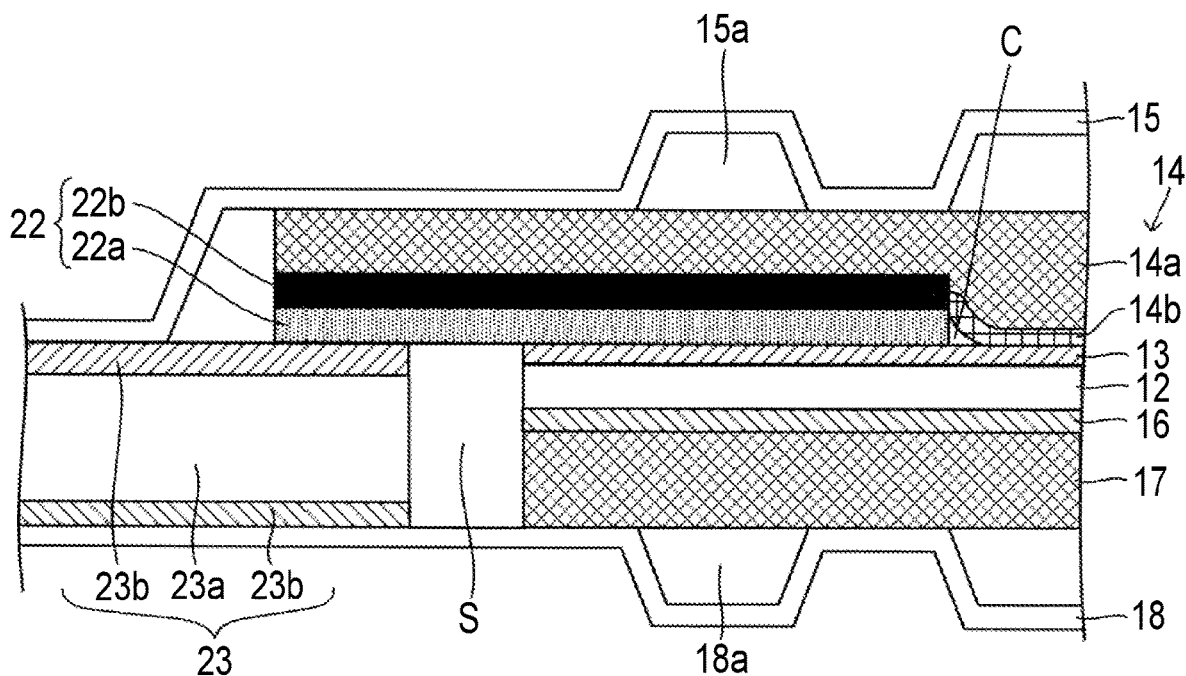
FIG. 5 is a diagram illustrating another embodiment.

FIG. 5 is a diagram illustrating another example of the embodiment of the outer peripheral portion. FIG. 5 is a diagram seen from the same viewpoint as that of FIG. 4. In the example of FIG. 5, the end surface of the cathode catalyst layer 13 is positioned at the same position as the end surface of the electrolyte membrane 12. In this case, the sheet portion 22a of the cover sheet 22 is laminated on the cathode catalyst layer 13 instead of being laminated on the electrolyte membrane 12.

Even with this embodiment, the same effects as described above are exhibited.

1.2f. Another Embodiment 2 of Outer Peripheral Portion

Figure 6:
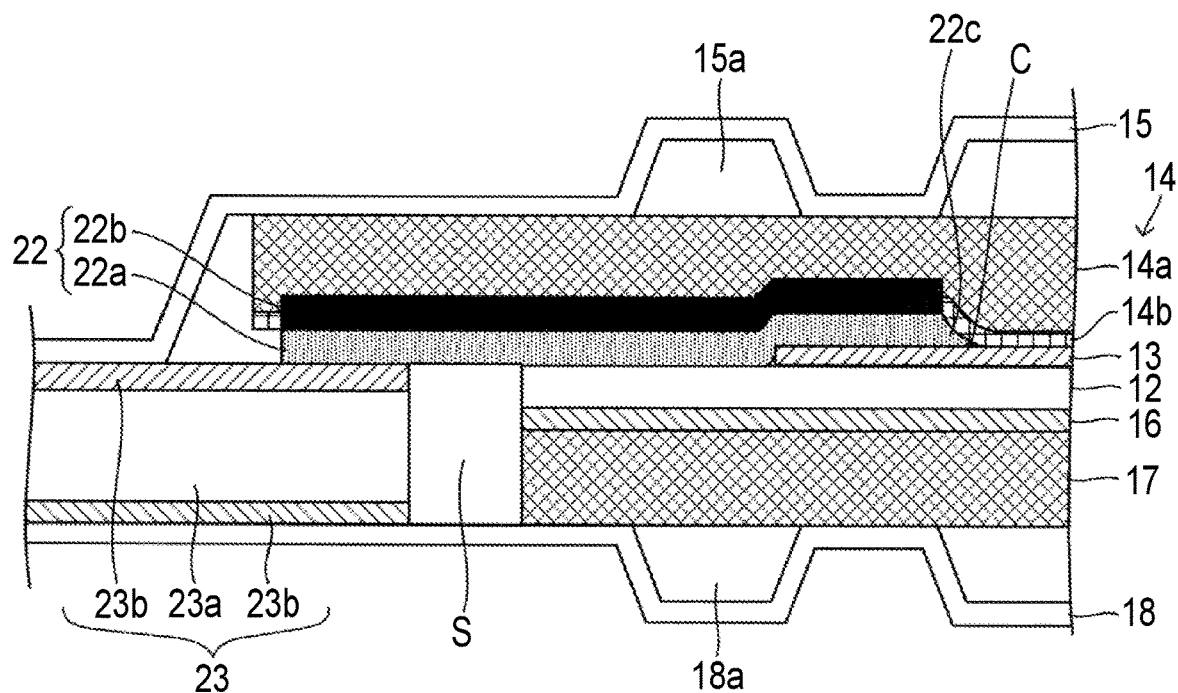
FIG. 6 is a diagram illustrating another embodiment.

FIG. 6 is a diagram illustrating another example of the embodiment of the outer peripheral portion. FIG. 6 is a diagram seen from the same viewpoint as that of FIG. 4. In the example of FIG. 6, in the sheet portion 22a of the cover sheet 22, a tapered portion 22c that is a tapered protrusion is provided at an end portion on the membrane electrode assembly side. By disposing the tapered portion 22c to embed at least a part of the space C, the space C can be further reduced, and the effects are more significant.

1.2g. Disposition of Cover Sheet

Figure 7:
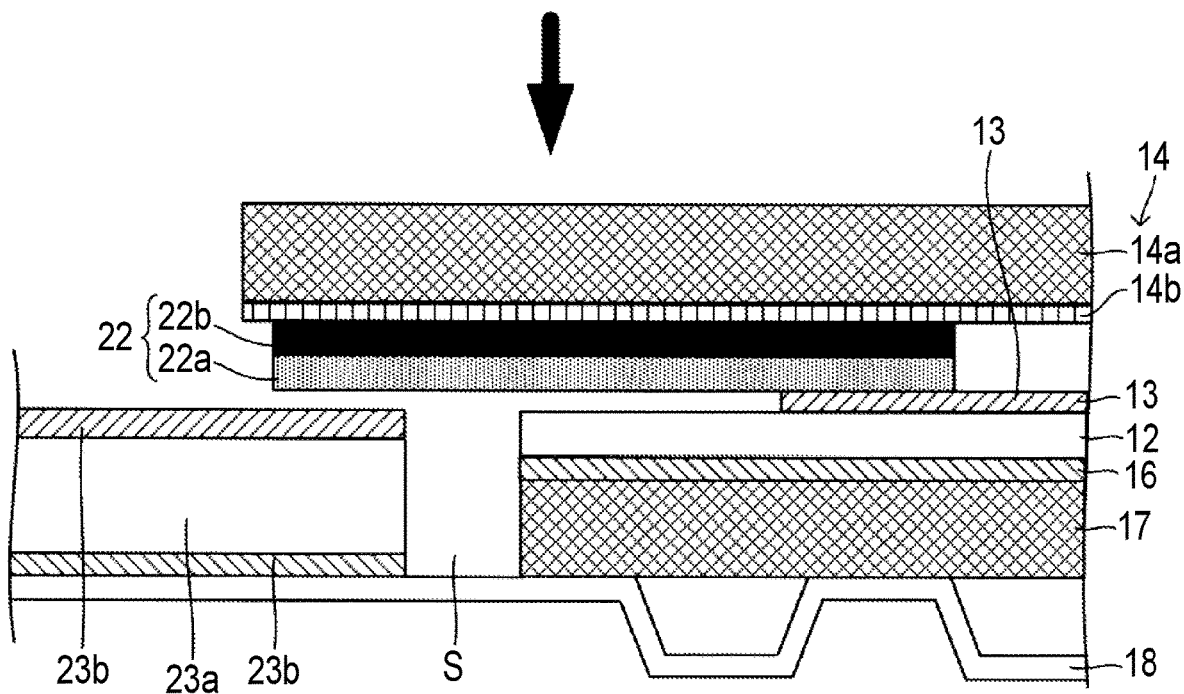
FIG. 7 is a diagram illustrating a method of disposing a cover sheet.
Figure 7:

A method of disposing the cover sheet 22 while allowing the permeation portion 22b to permeate into the cathode gas diffusion layer 14 is not particularly limited and, for example, can be performed as follows. FIG. 7 is a diagram for describing this method.

As illustrated in FIG. 7, the cover sheet 22 is disposed such that the sheet portion 22a is in contact with an end portion of a surface of the support 23 and an end portion of a surface of the cathode catalyst layer 13 to bridge the end portions, and the cathode gas diffusion layer 14 is disposed such that the MPL 14*b* is in contact with the permeation portion 22*b* side of the cover sheet 22.

Next, the permeation portion 22*b* is heated to a temperature at which the permeation portion 22*b* alone has fluidity and is softened and melts, and a pressing force is applied in a laminating direction of the respective layers as indicated by a straight line arrow in FIG. 7. As a result, the permeation portion 22*b* permeates into the cathode gas diffusion layer 14, and the layer configuration according to each of the examples can be realized.

At this time, the thickness of the cover sheet 22 before the permeation portion 22*b* permeates into the cathode gas diffusion layer 14 is not particularly limited and is preferably about 20 μm to 100 μm. The thickness is more preferably 40 μm to 100 μm from the viewpoint of more reliably ensuring a mechanical strength, and is still more preferably 40 μm to 80 μm from the viewpoint of further reducing the space C and ensuring a mechanical strength.

2. Fuel Cell

Figure 8:
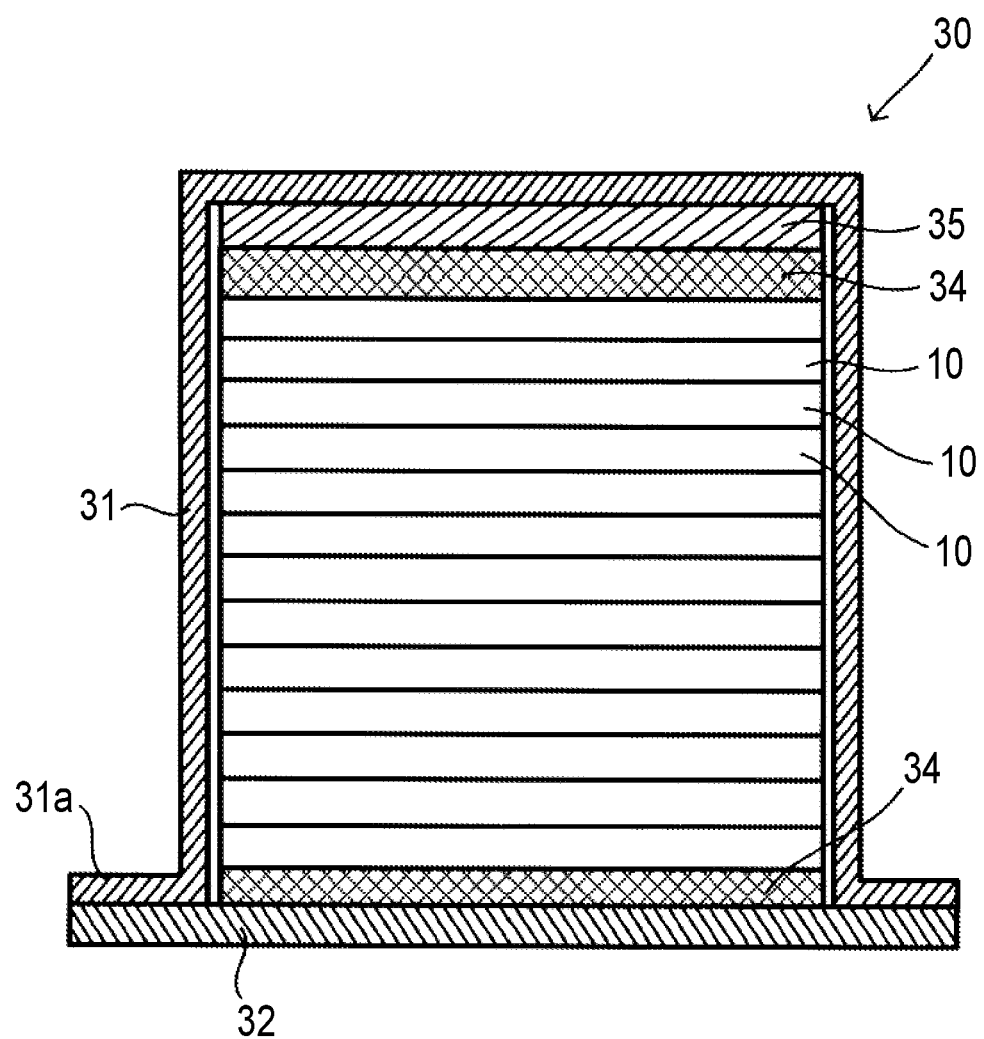
FIG. 8 is a diagram illustrating a fuel cell.

A fuel cell 30 is a member in which a plurality of (about 50 to 400) unit power generation cells 10 is laminated, and power is collected from the unit power generation cells 10. FIG. 8 illustrates the summary of the configuration. The fuel cell 30 includes a stack case 31, an end plate 32, the unit power generation cells 10, a current collector 34, and a biasing member 35.

The stack case 31 is a case that accommodates the laminated unit power generation cells 10, the current collector 34, and the biasing member 35. The stack case 31 according to the embodiment has a quadrangular cylinder shape, in which a first end is opened, a second end is closed, and a plate-shaped piece protrudes to a side opposite the opening along an edge of the opening to form a flange 31*a*.

The end plate 32 is a plate-shaped member and blocks the opening of the stack case 31. By covering an overlapping portion of the flange 31*a* of the stack case 31 with the end plate 32, for example, through bolts and nuts, the end plate 32 is fixed to the stack case 31.

The unit power generation cell 10 is as described above. The unit power generation cells 10 are laminated. At this time, the unit power generation cells 10 are laminated such that the cathode separator 15 of one unit power generation cell 10 overlaps the anode separator 18 of another adjacent unit power generation cell 10. The grooves 15*b* of the cathode separator 15 and the grooves 18*b* of the anode separator 18 overlap each other to form a coolant passage.

The current collector 34 is a member that collects a current from the laminated unit power generation cells 10. Accordingly, the current collector 34 is disposed at each of a first end and a second end of the laminate of the unit power generation cells 10, in which one of the current collectors 34 is a positive electrode and the remaining current collector 34 is a negative electrode. The current collector 34 is connected to a terminal (not illustrated) and is configured to be electrically connected to the outside of the fuel cell 30.

The biasing member 35 goes into the stack case 31 and applies to a pressing force to the laminate of the unit power generation cells 10 in the laminating direction. Examples of the biasing member include a plate spring.

3. Others

In the above description, it is assumed that each of the members on the cathode side is assigned with "the first" and each of the members on the anode side is assigned with "the second". Conversely, even when it is assumed that each of the members on the cathode side is assigned with "the second" and each of the members on the anode side is assigned with "the first", the same effects are exhibited.

What is claimed is:

1. A fuel cell comprising:
   a membrane electrode assembly including a first catalyst layer, a second catalyst layer, and an electrolyte membrane disposed between the first catalyst layer and the second catalyst layer;
   a first gas diffusion layer laminated on the first catalyst layer and having at least a part of an outer peripheral end portion provided to pass an outer peripheral end of the membrane electrode assembly;
   a second gas diffusion layer laminated on the second catalyst layer;
   a support disposed on at least a part of a periphery around the membrane electrode assembly; and
   a cover sheet disposed between the first gas diffusion layer and the membrane electrode assembly to bridge the support and at least one end portion of the electrolyte membrane or the first catalyst layer,
   wherein the cover sheet includes
      a sheet portion as a layer on a side of the membrane electrode assembly, and
      a permeation portion laminated on the sheet portion and permeating into the first gas diffusion layer, and
   wherein
      the first gas diffusion layer includes a diffusion member and a microporous layer provided on a surface of the diffusion member on a side of the first catalyst layer; and
      the permeation portion of the cover sheet passes the microporous layer and permeates up to the diffusion member.

2. The fuel cell according to claim 1, wherein an end surface of the support and an end surface of the membrane electrode assembly are disposed to face each other through a gap.

* * * * *